Aug. 25, 1953　　　　　J. VARAK　　　　　2,649,745
DEVICE FOR PROVIDING MOLD INDENTATIONS
AND CLEANING MOLD FORMING APPARATUS
Filed Oct. 28, 1950　　　　　　　　　　12 Sheets-Sheet 1

Inventor
Joseph Varak
By:
Gary, Desmond & Parker
Attorneys

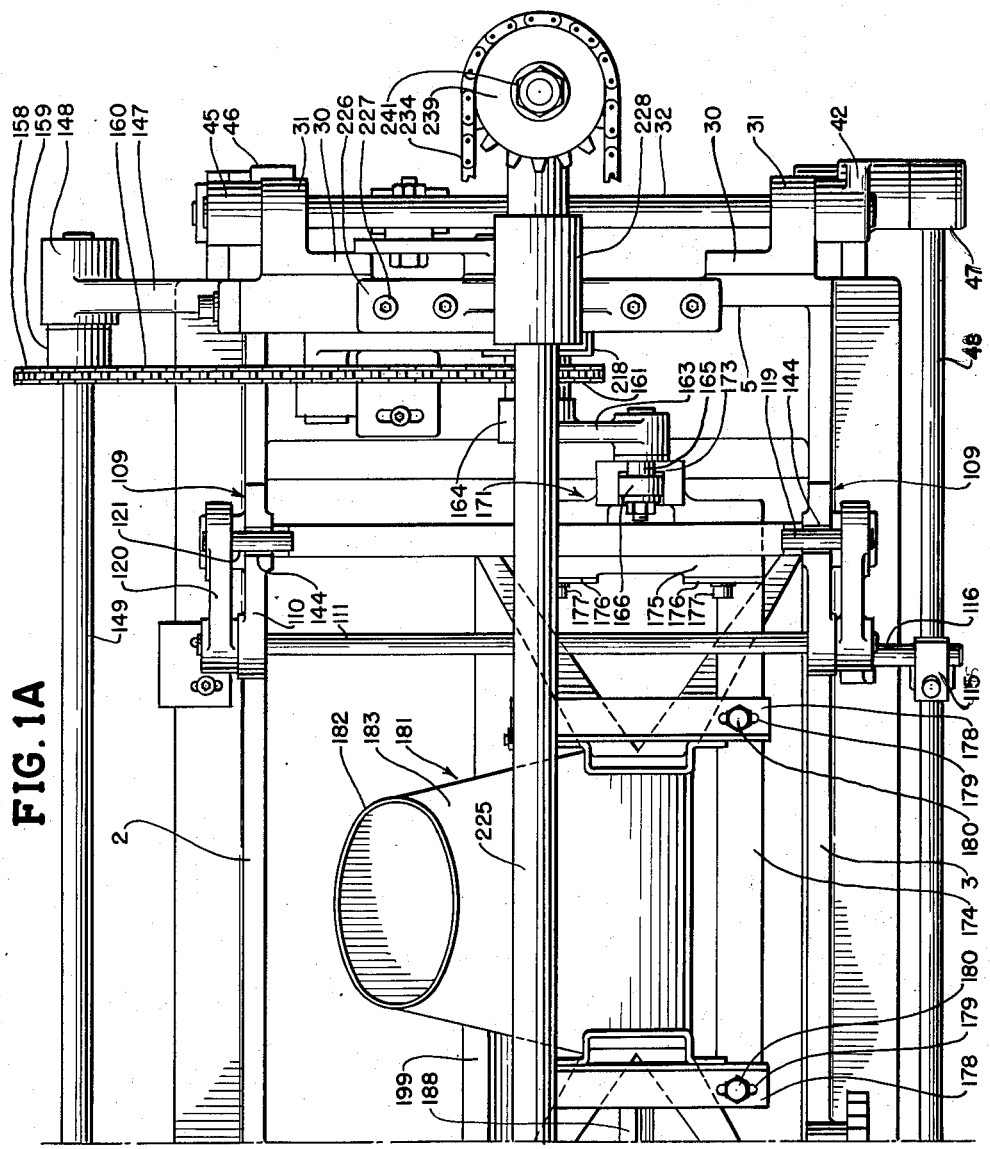

Aug. 25, 1953  J. VARAK  2,649,745
DEVICE FOR PROVIDING MOLD INDENTATIONS
AND CLEANING MOLD FORMING APPARATUS
Filed Oct. 28, 1950  12 Sheets-Sheet 3

Inventor
Joseph Varak
By:
Gary, Desmond & Parker
Attorneys

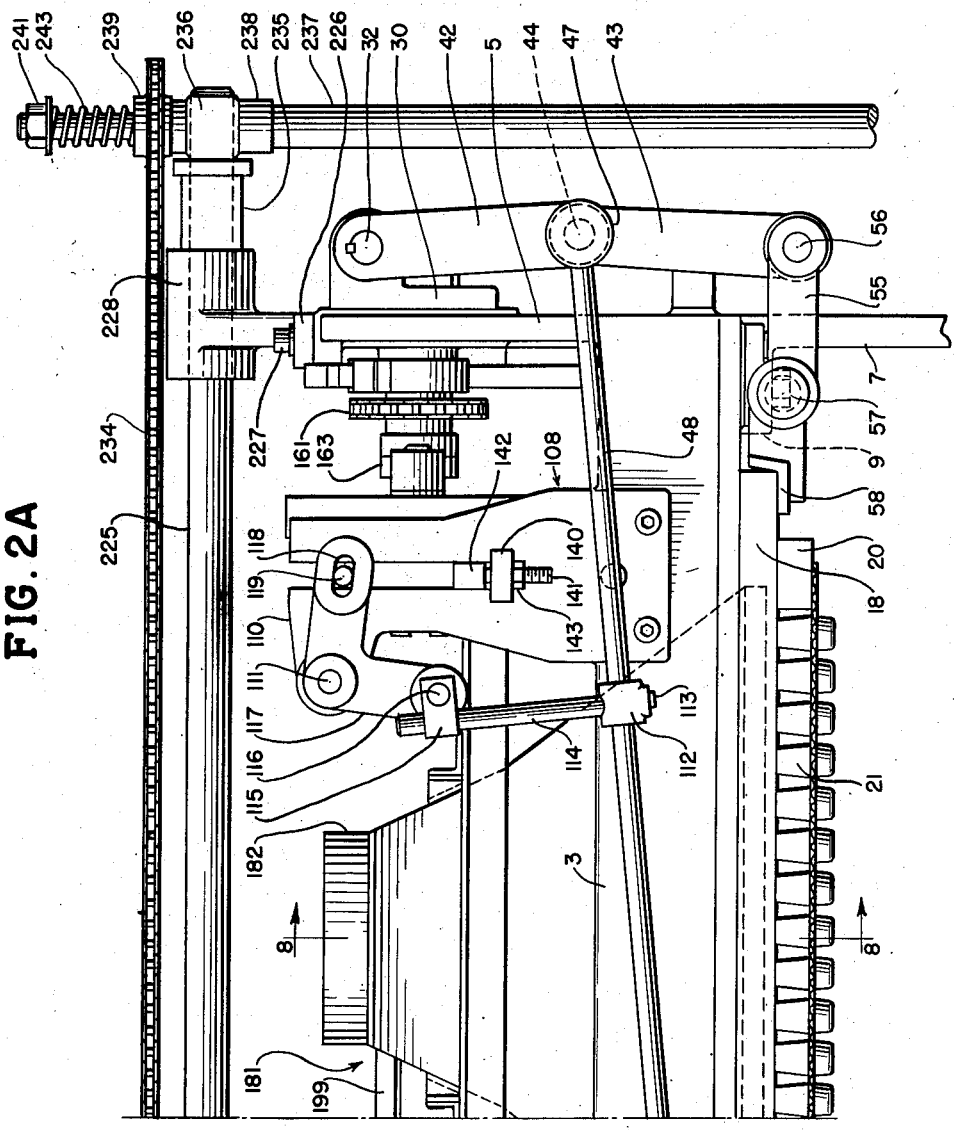

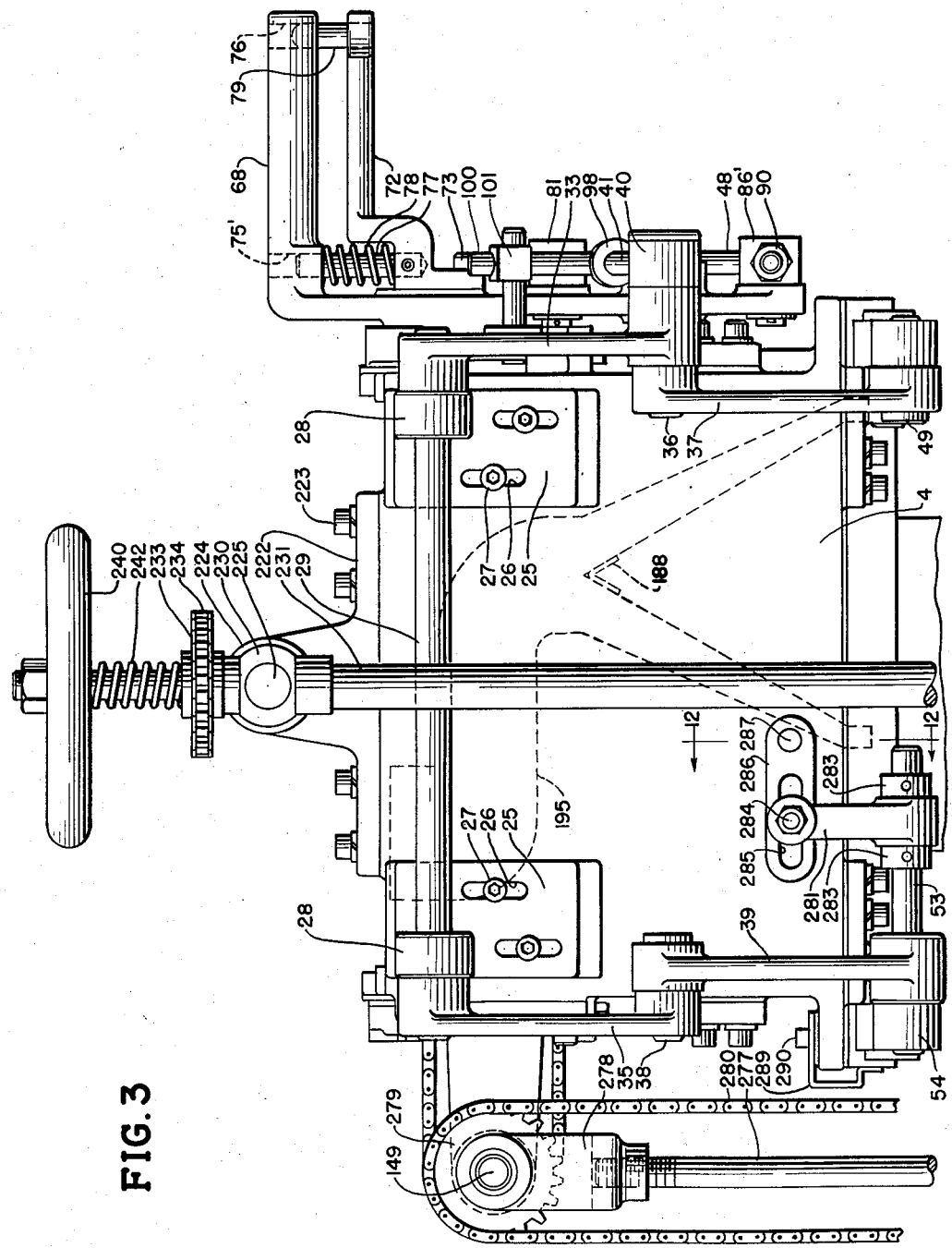

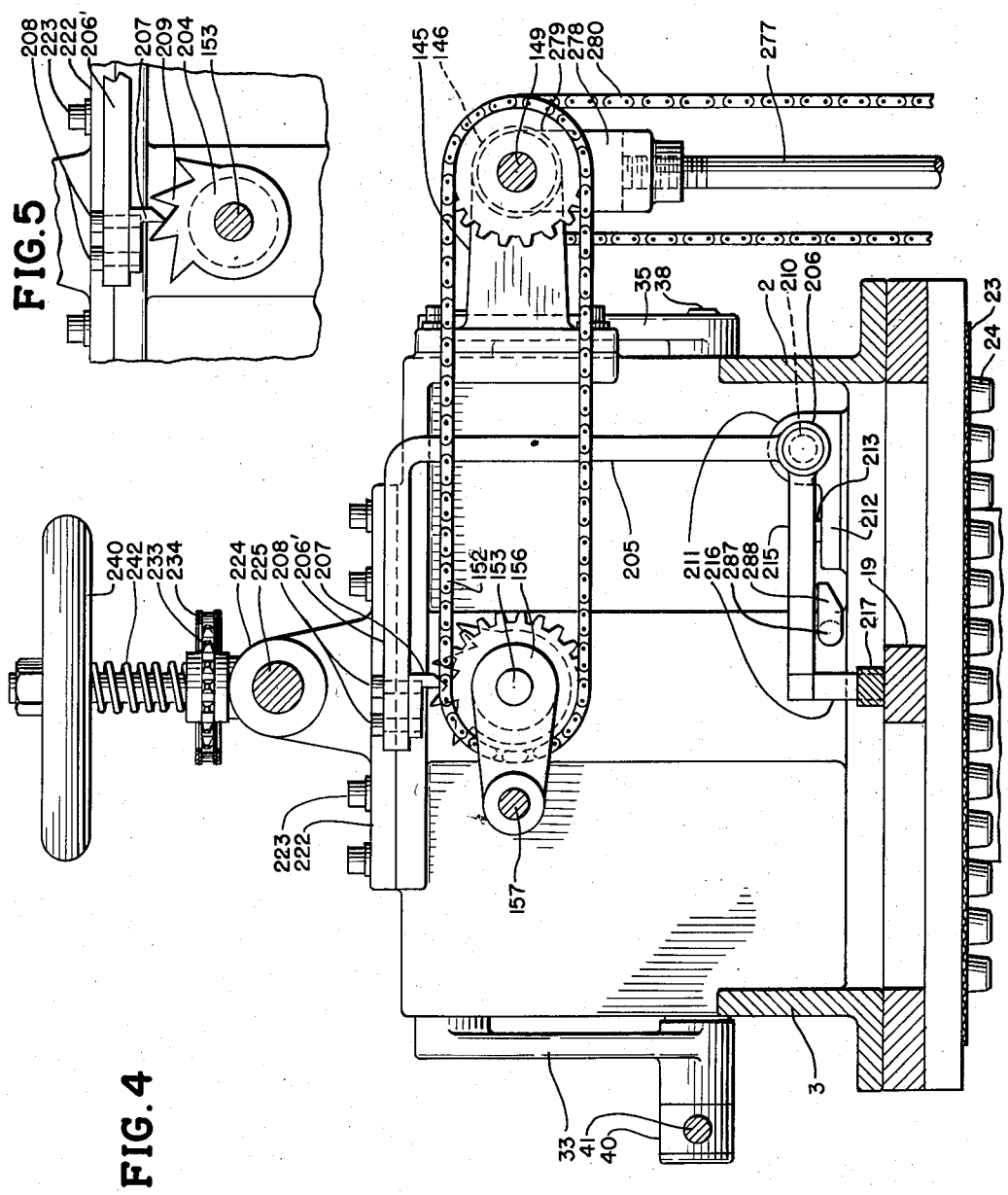

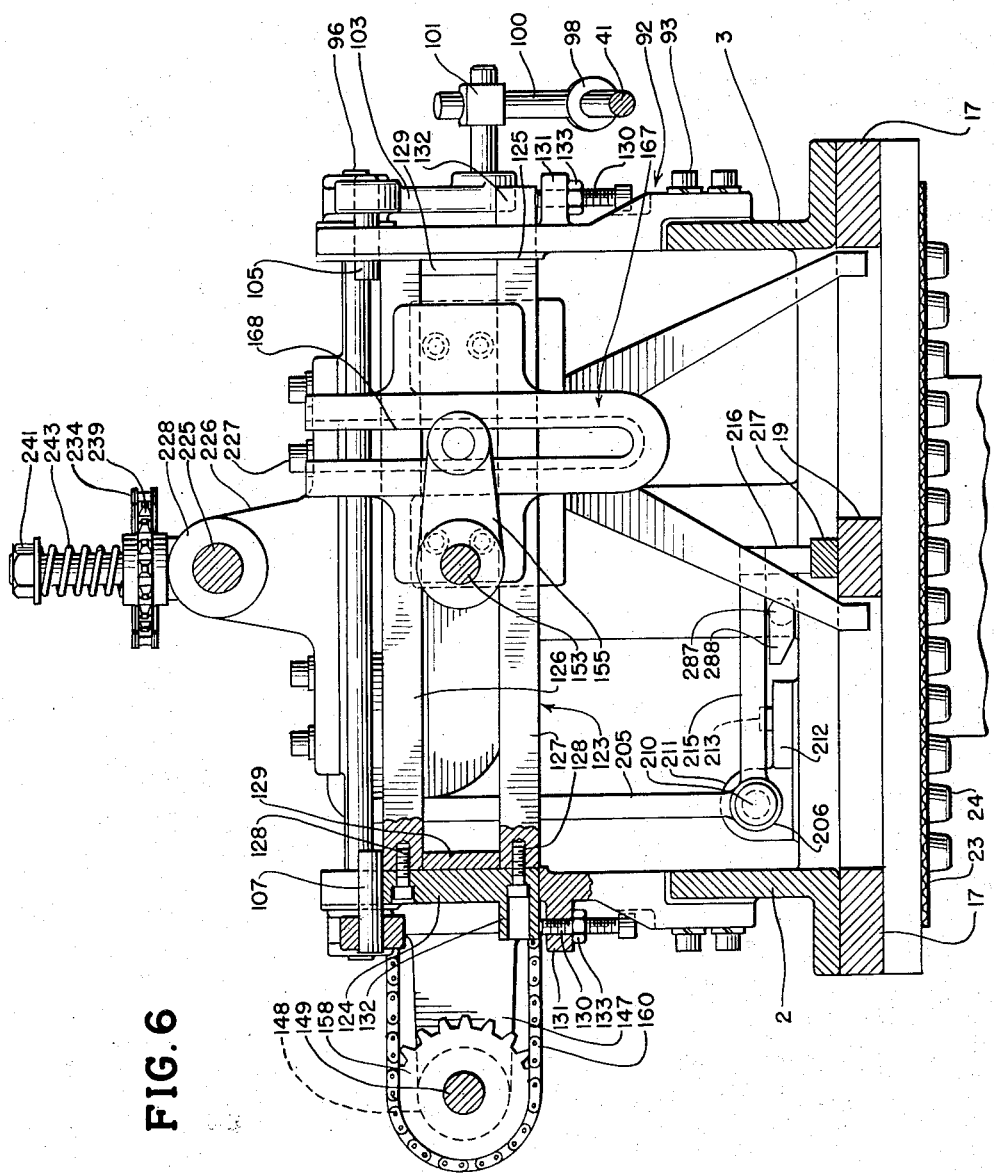

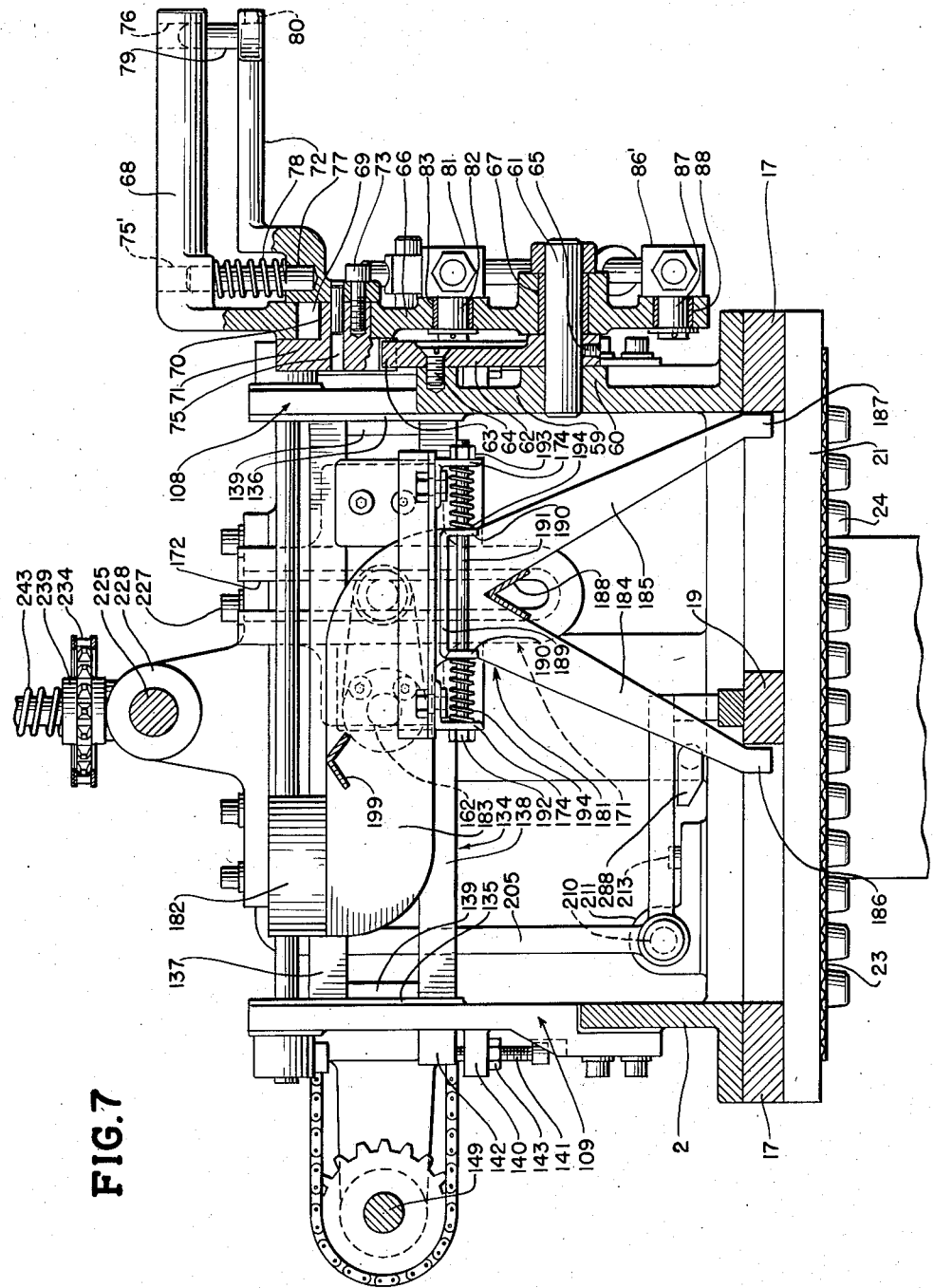

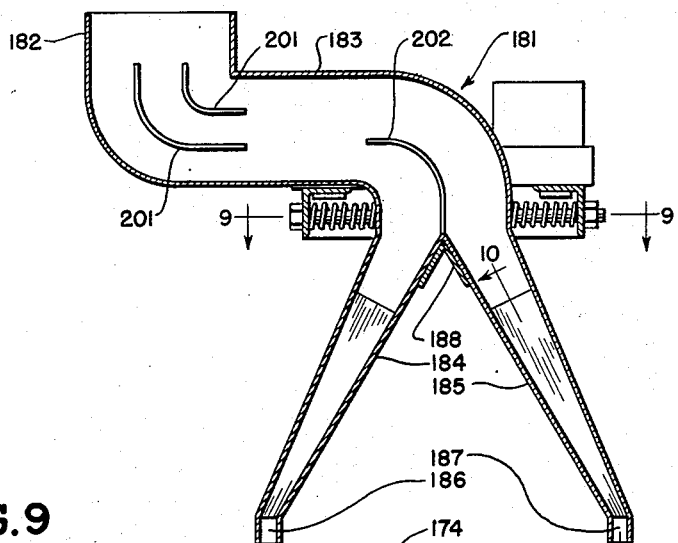
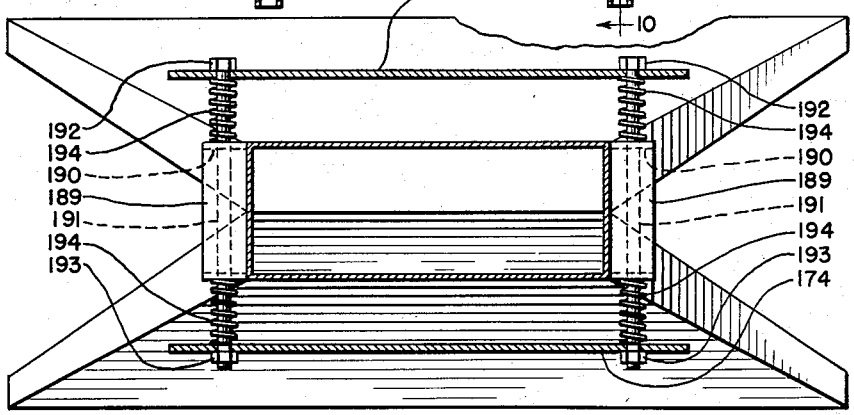
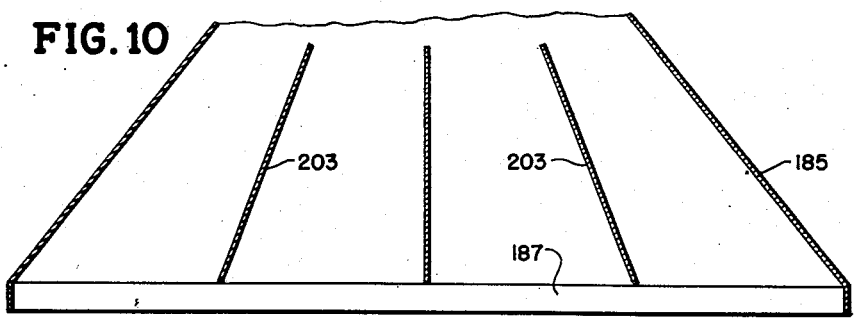

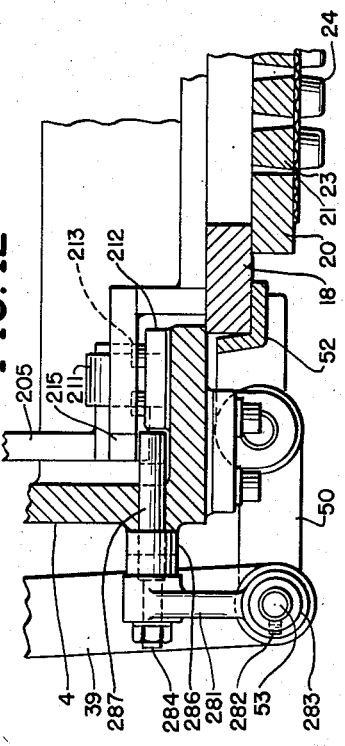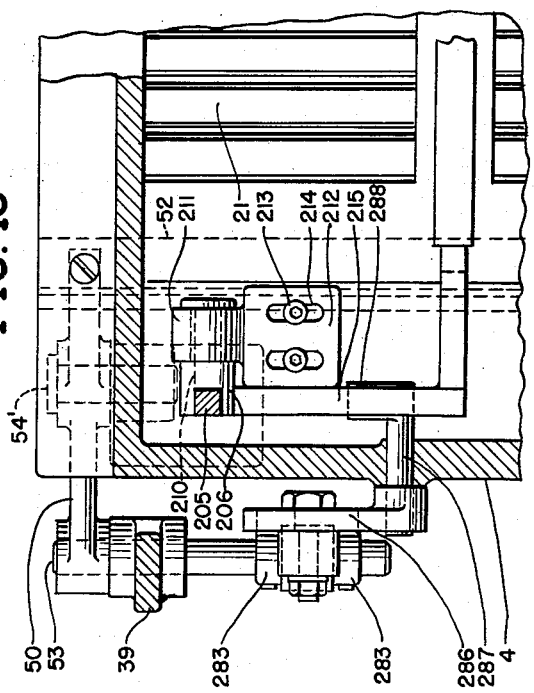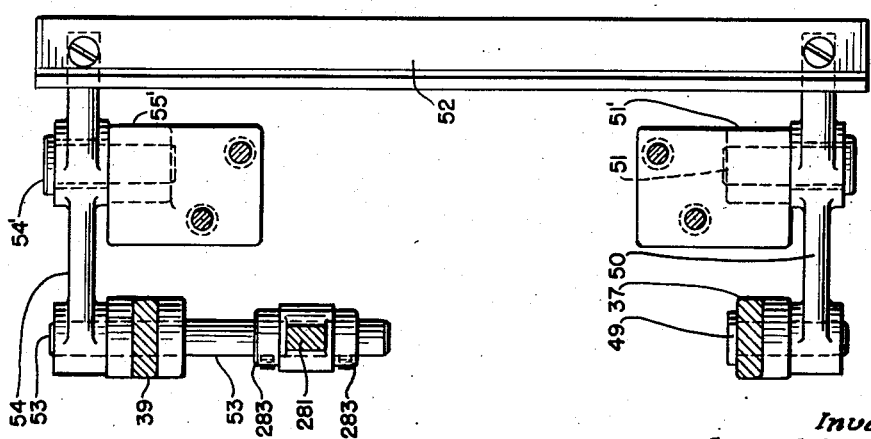

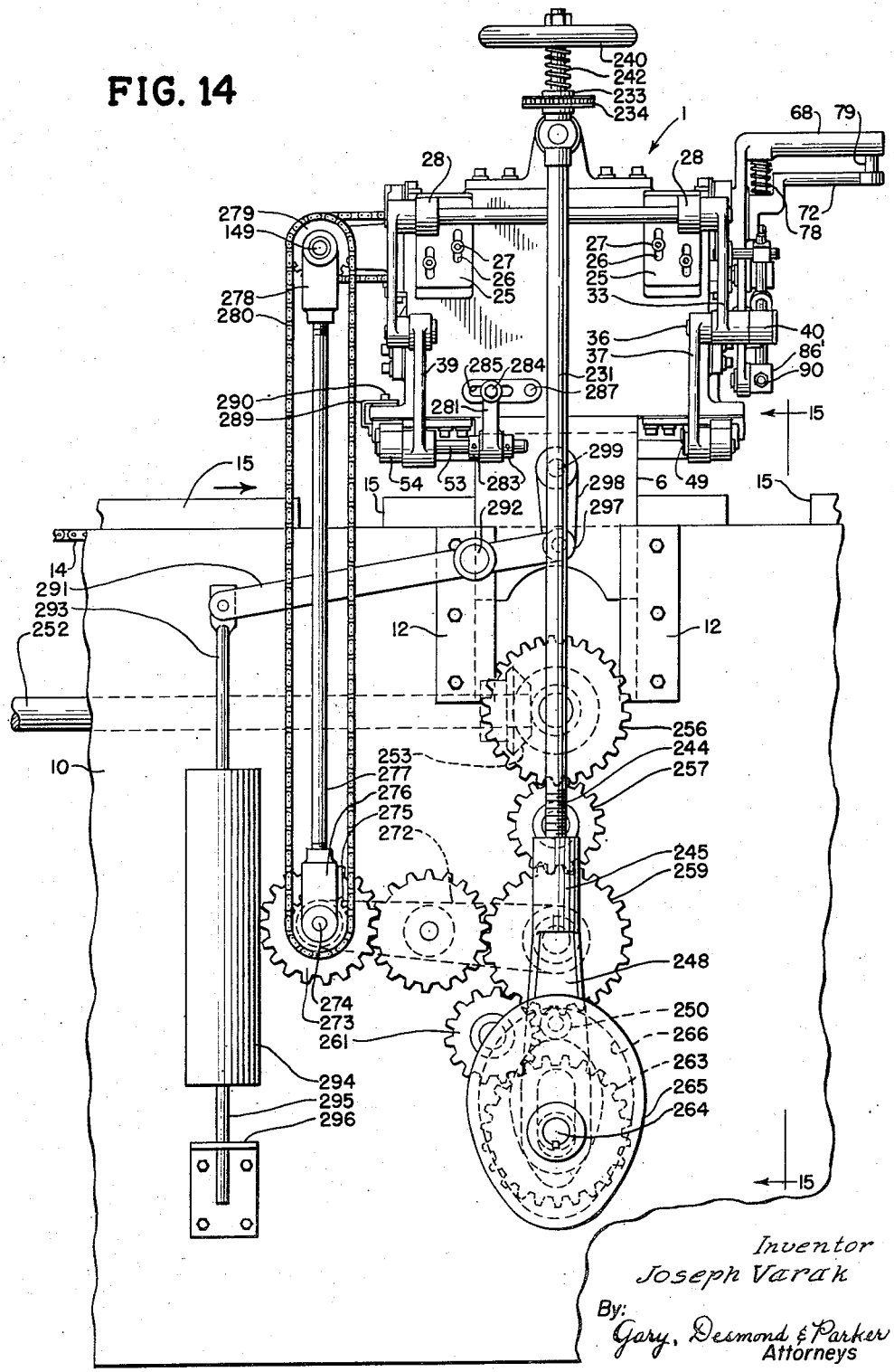

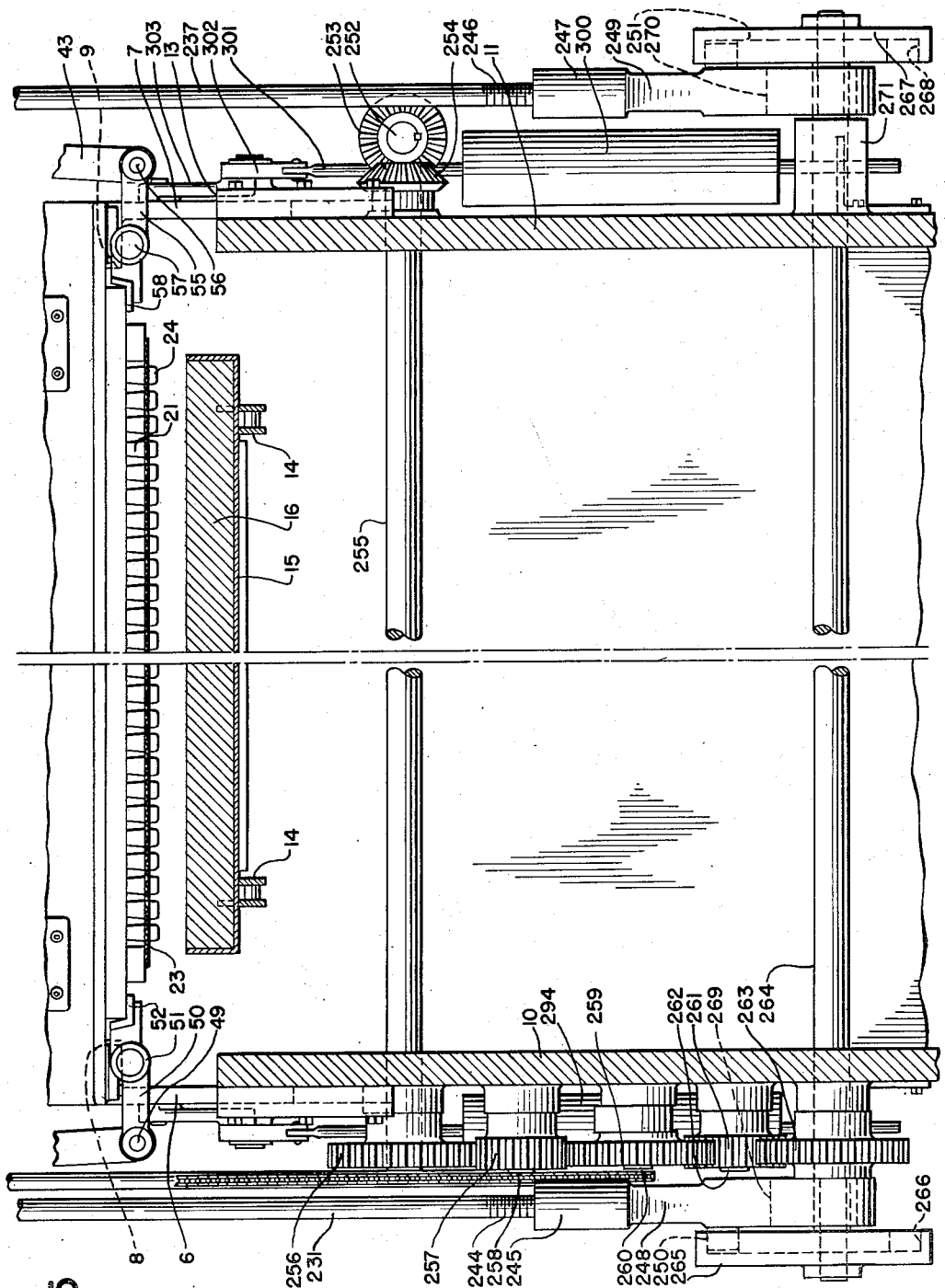

Patented Aug. 25, 1953

2,649,745

UNITED STATES PATENT OFFICE 2,649,745

DEVICE FOR PROVIDING MOLD INDENTATIONS AND CLEANING MOLD FORMING APPARATUS

Joseph Varak, Chicago, Ill., assignor to E. J. Brach & Sons, Chicago, Ill., a corporation of Illinois Application October 28, 1950, Serial No. 192,800

20 Claims. (Cl. 107—3)

This invention relates to improvements in candy making machines and refers particularly to improvements in a so-called printing mechanism or printer for a candy making machine.

In the making of some types of candies such as chocolate coated, cream centered candies, bonbons, or the like, the operation of forming the centers or cores of the candies is performed upon a machine. The machine comprises generally a conveyor which carries a plurality of shallow trays, the trays being carried forwardly in seriatim. The trays are initially filled with a very fine discrete material such as starch and during passage of the trays forwardly upon the machine indentations are provided in the starch mass which are employed as molds for the candy centers. The operation of providing the indentations in the starch mass is referred to as printing and the device for carrying out this operation is referred to as a printer.

The present invention is particularly directed to a printing mechanism or printer for a machine of the class hereinbefore described.

Printers heretofore proposed comprised essentially a vertically reciprocating frame which moves periodically in a vertical direction at right angles to the horizontal plane of the conveyor. The sequence of operations involves the forward passage of a tray filled with starch to a position beneath the printer. The conveyor moves in a step-wise fashion and when each tray moves beneath the printer the printer frame descends. An impression device is carried at the lower portion of the printer frame and usually takes the form of a planar member which carries a plurality of projections on its lower face. When the printer frame descends toward the starch filled tray the projections enter the mass of starch in the tray and provide a plurality of indentations in the starch mass. The printer frame then raises and the conveyor carries the starch mold forwardly, positioning a new starch carrying tray beneath the printer. As the molded starch mass is carried forwardly the same passes beneath a hopper carrying confectionery in a flowable state. The flowable confection from the hopper is deposited into the indentations and assumes the form of the indentations. Subsequently the tray carrying the starch and formed candy centers is dumped and the starch and the candy centers are separated. In normal operation the candy centers are subsequently coated with chocolate or the like and the starch is sifted and reused.

During the printing operation the descent of the printer frame and the penetration of the projections into the mass of starch tends to agitate the starch and the same being very finely divided a starch dust arises in the atmosphere in the vicinity of the printer. Recognizing that this condition is hazardous the art has heretofore employed vacuum canopies which are associated with the printer which are intended to carry away the starch dust which arises during the printing operation.

One of the important features of the present invention resides in the provision of an improved vacuum device associated with the printer whereby the starch dust is most efficiently removed during the printing operation.

Another important feature of the present invention resides in means upon the printer frame whereby the panel carrying the impression members may be quickly and conveniently indexed and secured to the bottom portion of the printer frame and can be quickly and conveniently removed therefrom when it is desired to position another printing panel upon the printer frame.

A further important feature of the present invention comprises a mechanism whereby the printing panel may be subjected to a plurality of impacts or raps during the period that the projections are entering the starch mass to facilitate compression and displacement of the starch when the indentations are formed.

A further important feature of the invention resides in the provision of means for quickly and conveniently raising the vacuum members and the rapping member when a panel carrying the projections is indexed and changed.

Other important features, objects and advantages of the present invention will be more apparent from the accompanying drawings and following detailed description.

In the drawings, Fig. 1 is a top plan view of the improved printer mechanism and Fig. 1A is a continuation of the device as illustrated in Fig. 1.

Fig. 2A is a continuation of the device illustrated in Fig. 1.

Fig. 3 is a side elevational view of the device shown in Figs. 1 and 1A, showing the front portion of the printing mechanism.

Fig. 4 is a transverse sectional view taken on line 4—4 of Fig. 2.

Fig. 5 is a detailed view illustrating the toothed wheel for operating the rapping mechanism.

Fig. 6 is a sectional view taken on line 6—6 of Fig. 2.

Fig. 7 is a sectional view taken on line 7—7 of Fig. 2.

Fig. 8 is a sectional view taken on line 8—8 of

Fig. 2A illustrating particularly one of the vacuum devices.

Fig. 9 is a sectional view taken on line 9—9 of Fig. 8.

Fig. 10 is an enlarged sectional view taken on line 10—10 of Fig. 8.

Fig. 11 is a detailed plan view of a portion of the rapping mechanism linkage.

Fig. 12 is a detailed sectional view taken on line 12—12 of Fig. 3.

Fig. 13 is a detailed plan view of the device illustrated in Fig. 12.

Fig. 14 is a front elevational view of the printer mechanism illustrating particularly the means for driving said mechanism from the candy making machine proper.

Fig. 15 is a fragmentary sectional view taken on line 15—15 of Fig. 14.

Figure 1:
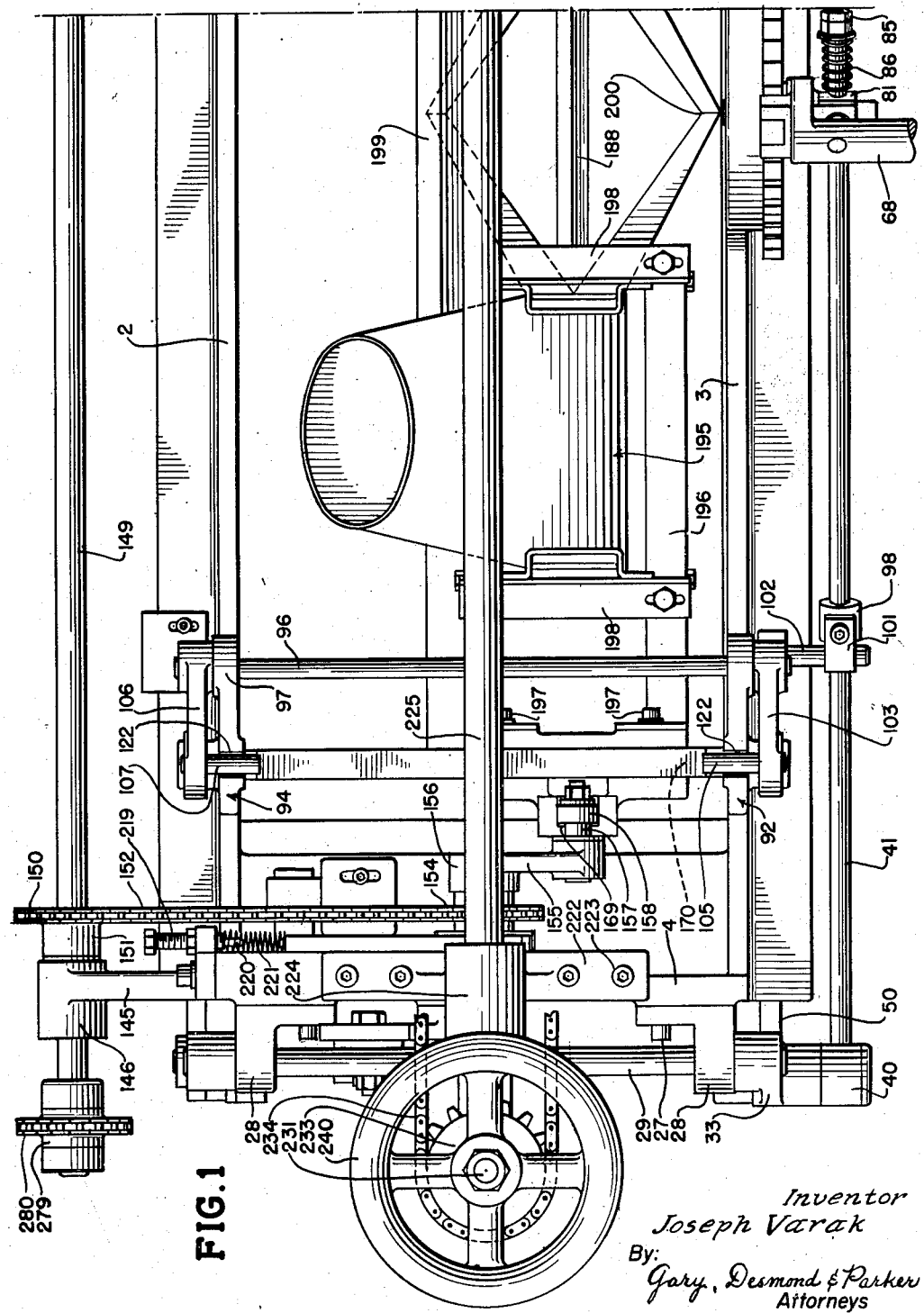

Referring in detail to the drawings and with specific reference to Figs. 14 and 15, 1 indicates generally the improved printing mechanism embodying the concepts of the present invention. The mechanism 1 comprises a frame having opposite side members 2 and 3 and opposite end members 4 and 5 (Figs. 1 and 1A). The frame of the printing mechanism is carried upon spaced L-shaped plates 6 and 7, the upper portions 8 and 9 of said L-shaped members being secured to the lower portion of the frame of the printing mechanism. 10 and 11 indicate portions of opposite frame members of a conventional candy making machine of the type hereinbefore described, the frame member 10 carrying spaced guides 12 and the frame member 11 carrying similar guides 13. The vertical portions of the L-shaped plates 6 and 7 are vertically slidably positioned in the guides 12 and 13 respectively.

As has been hereinbefore described, the candy making machine of which the frame members 10 and 11 comprise a part, includes a travelling chain conveyor 14 which moves in stepwise fashion beneath the frame of the printing mechanism 1. The conveyor 14 is adapted to carry trays 15 which are positioned upon the conveyor in spaced relationship along the upper pass of the conveyor. The conveyor 14 during the normal operation of the conventional candy making machine moves in stepwise fashion and the trays 15 are so positioned upon the conveyor that at each stationary period of the conveyor a tray 15 is disposed immediately beneath the printing mechanism 1. The trays 15 are filled with a finely divided starch 16 and during operation of the printing mechanism, said mechanism is lowered and raised to imprint indentations in the starch 16 carried in that tray 15 disposed immediately beneath the printing mechanism. After the printing mechanism 1 has completed its lowering and raising cycle the chain 14 moves forwardly to position the next adjacent tray 15 beneath the printing mechanism. The operation of imprinting or providing indentations in the starch 16 carried by the trays is thus repeated, the imprinted starch being carried forwardly in the trays to the next operation performed upon the conventional candy making machine.

Figure 2:
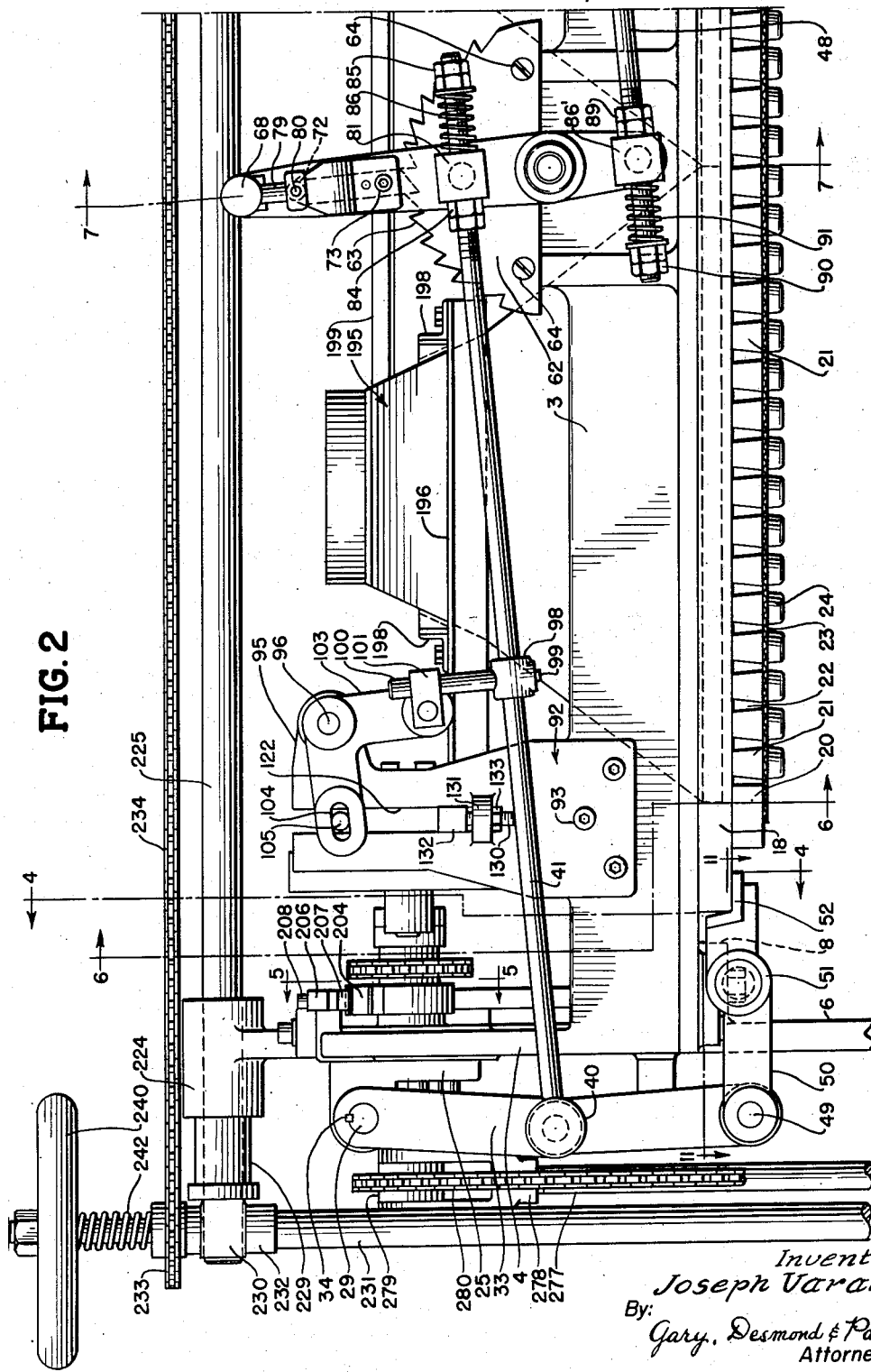
Fig. 2 is an end elevation of the printer mechanism illustrated in Fig. 1

An imprinting panel is employed for providing the indentations in the body of starch carried by the trays 15. Referring particularly to Figs. 2, 2A and 7, the panel comprises opposite frame members 17 and opposite end members 18 secured together to form a rectangular frame. A central longitudinal member 19 is secured at its opposite ends to the opposite end members 18, the member 19 being positioned midway between the opposite side members 17 and being parallel to said members. A pair of end slats 20 are disposed transversely to the side members 17 adjacent the end members 18. Between the slats 20 a plurality of mold supporting slats 21 are carried at their opposite ends upon the side members 17, the mold supporting slats 21 being disposed parallel to the end members 18 and being positioned parallel to each other and spaced relatively closely to each other to provide a plurality of slots 22. The mold supporting slats 21 are tapered at their upper portions as shown best in Figs. 2 and 2A. A wire screening 23 is secured to the end slats 20, said screening being in contact with the lower faces of the mold supporting slats 21. A plurality of mold projections 24 are carried upon the lower surface of the screening 23, said projections being disposed immediately beneath the respective mold supporting slats 21 and being spaced from each other both longitudinally and transversely. The projections 24 are adapted, when the printer descends, to enter the starch mass 16 and provide a plurality of indentations therein. The projections 24 are preferably secured to the screening 23 by a suitable adhesive.

A pair of plates 25 (Figs. 2 and 3) are mounted upon the end member 4 of the frame of the printing mechanism. Each of the plates 25 is provided with a pair of elongated slots 26 for the reception of bolts 27, the arrangement being such that the plates may be adjustably secured to the end frame 4. Each of the plates 25 carries a bearing 28 in which a shaft 29 is journaled.

A similar pair of plates 30 (Figs. 1A and 2A) are mounted upon the end portion 5 of the frame of the printing mechanism, the mounting arrangement being similar to the mounting of plates 25 upon the end member 4. Each of the plates 30 carries a bearing 31 in which a shaft 32 is journaled.

A link 33 (Fig. 3) is mounted at one end upon an end of shaft 29 to which it is rigidly secured by means of key 34. A link 35 is similarly secured at one of its ends to the opposite end of shaft 29. A pivot pin 36 connects the opposite end of link 33 to a link 37, the links 33 and 37 being pivotally secured together by means of the pin 36. A pin 38 pivotally connects link 35 with a link 39. The arrangement is such that links 33 and 37 form a toggle arrangement as do also links 35 and 39. A bearing block 40 is pivotally carried upon pin 36, said bearing block being rigidly connected to a rod 41.

Adjacent the end member 5 of the printer frame a similar linkage arrangement is carried. A link 42 is keyed to shaft 32 and at its opposite end is pivotally connected to a link 43, the pivotal connection being effected by pivot pin 44. At the opposite end of shaft 32 a link 45 is rigidly carried upon said shaft, said link being pivotally connected to a second link 46. The arrangement is such that links 42 and 43 form a toggle arrangement similar to the toggle arrangement comprising links 33 and 37 and similarly links 45 and 46 form a toggle arrangement similar to the toggle arrangement comprising links 35 and 39. A bearing block 47 is pivotally mounted upon pin 44 and is rigidly connected to a rod 48.

Link 37 at its lower end is pivotally connected as at 49 (Figs. 2 and 11) to an arm 50 which in turn is pivoted intermediate its length upon pin 51 carried in bearing 51'. The opposite end of arm 50 carries one end of a jaw 52 which is adapted to engage one of the end members 18 of the panel which carries the projections 24. In similar fashion link 39 is pivotally connected as at 53 (Figs. 3 and 11) to an arm 54 which is pivoted intermediate its length upon pin 54′ carried by bearing 55′ and carries at its opposite end the opposite end of jaw 52.

At the opposite end of the frame of the printing mechanism link 43 pivotally connects with arm 55 as at 56 (Fig. 2A). Arm 55 is pivoted intermediate its length, as at 57, and at the opposite end of said arm one end of a jaw 58 is carried for engagement with the opposite end member 18 of the impression panel. A similar arrangement is associated with link 46, the arrangement being such that the panel carrying the projections 24 is gripped along the frame members 18 of the rectangular frame of the panel.

As has been hereinbefore described the bearing blocks 40 and 44 are rigidly connected respectively to rods 41 and 48. When the rods 41 and 48 are moved axially the toggle joints hereinbefore described are actuated. For example, referring particularly to Fig. 2, when rod 41 is moved outwardly with respect to the machine, arm 50 is so rocked as to disengage jaw 52 from the end member 18. In view of the fact that link 33 is rigidly connected to shaft 29 the toggle arrangement comprising links 35 and 39 also function to release the jaw on the opposite side of the printer mechanism. Similarly when rod 48 (Fig. 2A) is moved axially outwardly jaw 58 is disengaged from the end member 18. When the respective rods 41 and 48 are moved axially inwardly the toggle arrangements associated with said rods function to cause the respective jaws to engage the end members 18 and securely fasten the impression panel upon the lower portion of the frame of the printing mechanism.

An intermediate portion of the frame 3 extends upwardly above the upper portion of said frame member as shown best at 59 in Fig. 7. The portion 59 is provided with an apertured boss 60 which is adapted to carry a pivot pin 61. A segmental ratchet plate 62 having ratchet teeth 63 is secured to the portion 59 of the frame 3 by means of a plurality of screws 64. The segmental ratchet plate is provided with an opening adjacent its lower end and embraces the pivot pin 61. A set screw 65 rigidly secures the pin 61 to the ratchet plate 62.

A lever arm 66 is pivoted upon pivot pin 61 intermediate its length, said arm being provided with a sleeve bearing 67 which embraces the pivot pin 61 and permits the arm 63 to be freely oscillated about pin 61. The upper end of arm 66 carries a handle 68 and said arm intermediate its length is provided with a slot 69 in which a projection 70 carried by a pawl 71 is slidably positioned. A pawl manipulating handle 72 is secured to the projection 70 by means of a screw 73 which threadedly engages in the projection 70 and passes through a portion of the pawl manipulating handle 72. A pin 74 is positioned in an opening 75 in pawl 71, said pin being adapted to engage in an aligned opening in the pawl manipulating handle 72 whereby rotary movement of the handle 72 with respect to the pawl 71 is prevented.

Handle 68 is provided with a pair of apertures 75′ and 76. A pin 77 is carried by the pawl manipulating handle 72 and extends upwardly into aperture 75′ in which it is freely slidable. A coil spring 78 embraces pin 77 and functions to urge the pawl manipulating handle 72 away from handle 68. At the outer end of the handle 72 a pin 79 is rigidly carried being secured to the handle by a set screw 80. Pin 79 extends upwardly into aperture 76 provided in handle 68 wherein said pin is slidably movable. The arrangement is such that spring 78 normally urges pawl manipulating handle 72 downwardly thereby urging pawl 71 into contact with the ratchet teeth 63. By moving the pawl manipulating handle 72 against the compression of spring 78 the pawl 71 may be disengaged from the ratchet teeth 63. By the provision of the spaced pins 77 and 79 the pawl manipulating handle 72 may be caused to move rectilinearly without binding.

A bearing block 81 is rigidly carried upon a pin 82 which is journalled in a sleeve 83 positioned in an aperture in arm 66, the pin 82 being freely rotatable within the sleeve 83. The block 81 is provided with an aperture in which the threaded end of rod 41 is positioned. A pair of rods 84 engage with the threads adjacent the end of rod 41 and function as a stop limiting axial movement of rod 41 with respect to block 81 in one direction. A pair of nuts 85 are threadedly engaged adjacent the end of rod 41 on the opposite side of block 81 and a coil spring 86 embraces that portion of rod 41 between block 81 and nuts 85.

A block 86′ similar to block 81 is carried upon a pin 87 which is journalled in a sleeve 88 positioned in an aperture provided in an arm 66. Block 86′ is provided with an aperture adapted to receive rod 48, said rod being freely movable in the aperture provided in block 86′. A pair of nuts 89 are threadedly engaged with rod 48 and function to limit axial movement of the rod 48 with respect to block 86′ when said rod is moved in one direction. A pair of nuts 90 are threadedly carried at the end of rod 48 on the opposite side of block 86′ and a coil spring 91 embraces that portion of rod 48 between nuts 90 and block 86′.

The arrangement is such that by moving arm 66 about the pivot pin 61 opposite axial movements may be imparted to rods 41 and 48. As viewed in Fig. 2 when arm 66 is moved in a clockwise direction blocks 81 and 86′ respectively compress springs 86 and 91. In this fashion rods 41 and 48 are resiliently moved to move the bearing blocks 40 and 47 of the toggle joints inwardly. This operation tends to bring the respective links of the toggle joints into alignment whereby the jaws associated with the toggle arrangements tend to resiliently clamp the end members 18 of the impression panel. By the provision of the pawl and ratchet arrangement hereinbefore described the jaws may be maintained in resilient clamping relationship with respect to said end members. To release the jaws it is merely necessary to move the pawl manipulating handle 72 toward handle 68 whereby the pawl is disengaged from the ratchet teeth 63 and the jaws disengage the end members 18. By the provision of the resilient clamping arrangement hereinbefore described both end members 18 may be securely clamped in position even though the thickness of said end members may vary since a small difference in thickness is compensated for by the difference in degree of compression of springs 86 and 91.

Referring particularly to Figs. 1 and 2, a gib 92 is mounted upon frame member 3 by means of screws 93. A similar gib 94 is mounted upon frame member 2 opposite the gib 92, the gib 94 being secured to the frame member 2 by means of screws (not shown). The gib 92 carries an extension 95 which is provided with an aperture to receive a shaft 96. Similarly gib 94 carries an extension 97 provided with an aperture in which shaft 96 is journalled at its opposite end.

A collar 98 is positioned upon an intermediate portion of rod 41 being rigidly secured thereto by means of set screw 99. A rod 100 is rigidly secured to collar 98 and carries adjacent its upper end a block 101. A shaft 102 is rigidly carried by block 101 and functions as a pivot pin for one end of bell crank lever 103, said lever being pivotally mounted upon one end of shaft 96. The opposite arm of lever 103 is provided with a slot 104 in which a pin 105 is positioned.

At the opposite end of shaft 96 a link 106 is rigidly secured to said shaft. The link 106 is provided with a slot adjacent its end similar to slot 104 in which a pin 107 is loosely positioned.

Referring particularly to Figs. 1A and 2A, a pair of gibs 108 and 109 are positioned respectively upon frame members 3 and 2. Each of the gibs have extensions 110 in which a shaft 111 is journalled. A collar 112 is carried intermediate the length of rod 48 and is rigidly secured thereto by means of set screw 113. Rod 114 is rigidly carried by collar 112 and in turn at its upper end carries block 115. A pin 116 is rigidly secured to block 115 and is journalled in one end of bell crank lever 117. The bell crank lever 117 is pivoted upon one end of shaft 111. The opposite end of the bell crank lever 117 is provided with a slot 118 in which a pin 119 is freely positioned. A link 120 is rigidly carried at the opposite end of shaft 111 and is provided with a slot, similar to slot 118 adjacent its free end in which a pin 121 is loosely positioned.

Disposed between the gibs 92 and 94 in alignment with slots 122 in said gibs is a horizontal guide frame 123 (Fig. 6). The guide frame 123 comprises opposite end members 124 and 125 and an upper cross member 126 and a lower cross member 127. The cross members 126 and 127 are secured to the end members 124 and 125 by countersunk screws 128, only one pair of which is illustrated. A spacer 129 is formed integral with each of the end members 124 and 125 whereby the upper and lower bars 126 and 127 respectively are supported in proper spaced relationship to each other.

The horizontal guide frame 123 is adapted for vertical reciprocatory movement, its lower position being determined by set screws 130 positioned in lugs 131 comprising a portion of the opposite gibs 92 and 94. The end frame members 124 and 125 carry integral extensions 132 which, at the lowermost position of the frame 123 rest upon the ends of screws 130. The screws 130 are threadedly positioned in the lugs 131 and may be locked in a desired position by means of nuts 133 which bear against the lower surface of the lugs 131.

Referring particularly to Fig. 7 a similar horizontal guide frame 134 is carried between the opposite gibs 108 and 109. The frame 134 comprises end members 135 and 136 and upper and lower frame members 137 and 138 respectively. The end members 135 and 136 are secured to the upper and lower frame members 137 and 138 by means of screws (not shown) similar to the screws 128 hereinbefore described in conjunction with the guide frame 123. The end members 135 and 136 carry spacers 139 which function to properly space the upper and lower bars 137 and 138 from each other.

Each of the gibs 108 and 109 carry outwardly extending lugs 140 in which screws 141 are threadedly positioned, the lower frame member or bar 138 being provided with opposite extensions 142 which when the frame 134 is in its lowermost position rest upon the ends of the screws 141. Lock nuts 143 function to maintain said screws in a desired adjusted position.

Pins 105 and 107 positioned in the slots 122 provided in the gibs 92 and 94 are rigidly connected to the upper portion of the guide frame 123 preferably by means of welding. The arrangement is such that when rod 41 moves outwardly when handle 68 is manipulated to swing arm 69, the bell crank lever 103 is rocked in a clockwise direction, as viewed in Fig. 2, thereby raising the slotted end of the bell crank lever and raising both pins 105 and 107. The pins 105 and 107 being guided in the slots 122 move vertically upwardly thereby moving the guide frame 123 vertically upwardly. When the arm 69 is released so as to move rod 41 inwardly with respect to the machine the bell crank lever 103 swings in the opposite direction and consequently the guide frame 123 moves vertically downwardly until the extensions 132 rest upon the ends of screws 130.

Referring particularly to Figs. 1A and 2A pins 119 and 121 are respectively positioned in slots 144 provided in the opposite gibs 108 and 109. The pins 119 and 121 are rigidly connected to the guide frame 134, preferably by welding, the arrangement being such that when rod 48 is moved axially outwardly with respect to the machine the bell crank lever 117 functions to raise pin 119 and in view of the fact that shaft 111 rotates with the bell crank lever pin 121 is simultaneously raised by the rocking of the arm 120. In this fashion the guide frame 134 is raised and lowered in a manner similar to and simultaneously with the raising and lowering of the guide frame 123.

A bearing bracket 145 is mounted upon the end member 4 of the machine, said bracket carrying a bearing 146. A similar bracket 147 is mounted upon the end member at the opposite end of the machine, said bracket carrying a bearing 148. A shaft 149 is journalled adjacent its opposite ends in the bearings 146 and 148.

Referring particularly to Figs. 1 and 6 a sprocket wheel 150 carried by hub 151 is rigidly mounted upon shaft 149 adjacent bearing 146 and a sprocket chain 152 is trained around the sprocket wheel 150. A stub shaft 153 is carried by the end member 4 and extends inwardly with respect to the machine, said shaft carrying a sprocket wheel 154 which is loosely mounted upon the shaft 153. The sprocket chain 152 is also trained around sprocket wheel 154, the latter being driven from shaft 149.

An arm 155 is carried by a hub 156 which is rigidly connected to the hub of the sprocket wheel 154 and turns therewith. At the end of the arm 155 a shaft 157 is carried and a freely rotating roller 158 is carried upon the end of the shaft 157.

A sprocket wheel 158 (Fig. 1A) is carried upon hub 159 which in turn is keyed to shaft 149. A sprocket chain 160 is trained around sprocket wheel 158 and is adapted to drive a sprocket wheel 161 freely rotatable upon a shaft 162 (Fig. 7), the latter being carried by the end frame member 5 and extending inwardly with respect thereto. An arm 163 carried by hub 164 is rigidly connected to the hub of the sprocket wheel 161 and the end of arm 163 carries a shaft 165 upon which a roller 166 is freely rotatable.

It will be noted that both arms 155 and 163 are driven from shaft 149, said arms being rotated about the stub shafts 153 and 162 respectively in timed relationship with each other.

A horizontally slidable gib 167 is provided with a vertical slot 168, the slot being defined by inwardly extending shoulders 169 (Fig. 1) and the roller 158 is adapted to be positioned within the slot 168. The horizontally slidable gib 167 carries a block 170 (Fig. 2) which is confined between the upper and lower bars 126 and 127 respectively of the frame 123. The arrangement is such that when arm 155 is rotated roller 158 operating in slot 168 functions to reciprocate the gib 167, the block 170 riding between the two bars 126 and 127 of frame 123 and being guided by said bars for horizontal motion.

A similar gib 171 provided with a vertical slot 172 is positioned at the opposite end of the machine, the slot 172 being defined by the inwardly extending shoulders 173 (Fig. 1A). The roller 166 is positioned in the slot 172, being confined therein by the shoulders 173. The gib 171 carries a block (not shown) which is slidably positioned between the upper and lower bars 137 and 138 respectively of the frame 134. The arrangement is such that rotation of the arm 163 results in reciprocation of the gib 171, the block carried by said gib sliding between the bars 137 and 138. It can readily be seen that in view of the fact that arms 155 and 163 rotate in unison the gibs 167 and 171 move horizontally backwardly and forwardly in timed relationship to each other.

A pair of angle irons 174 are mounted upon a portion 175 of gib 171 which extends beyond the frame 134. The angle irons 174 at their ends are provided with upturned plates 176 which are secured to the member 175 by means of screws 177. A pair of transverse angle irons 178 are mounted in spaced relationship upon the angle irons 174, the angle irons 178 being provided with slots 179 for the reception of screws 180, the arrangement being such that angle irons 178 are movable transversely with respect to the angle irons 174 a distance determined by the length of the slots 179.

Referring particularly to Fig. 7 a vacuum hood 181 is carried by the angle irons 178. The vacuum hood 181 comprises an inlet collar 182, a connecting conduit 183 and divided vacuum legs 184 and 185. The legs 184 and 185 are similar to each other and each is of hollow construction having mouth portions 186 and 187 respectively. The mouth portions, when the frame 134 is in its lowermost position, being positioned above and adjacent to the transverse slats 21 of the impression panel carried by the machine. An angle member 188 is disposed at the crotch of the legs 184 and 185 to reinforce the structure.

The connecting conduit 183 of the vacuum hood 181 is rigidly secured to the transverse angle irons 178 preferably by welding and said conduit also carries a pair of channel brackets 189 which are disposed on opposite sides of the hood 181. The channel brackets 189 have downwardly extending flanges 190 which are apertured to receive a rod 191. The rod 191 also passes through apertures provided in the opposite angle irons 174, the rod 191 having a hexagon head 192 at one end and carrying a nut 193 at the opposite end. Coil springs 194 embrace opposite portions of the rod 191 and are confined between the flanges 190 of the channel brackets 189 and the flanges of the angle irons 174.

The arrangement is such that when the gib 171 is reciprocated horizontally by the rotation of arm 163 the angle irons 174 are carried transversely to their length in a horizontal direction. The vacuum hood 181 is mounted in a floating fashion upon the angle irons 174 and as a result of the movement of the angle irons, as described, the vacuum hood is moved in a reciprocating fashion. In so moving the vacuum hood the mouths 186 and 187 of the vacuum legs 184 and 185 move adjacent the upper surfaces of the slats 21 and parallel to said slats. The timing arrangement is such that with one complete revolution of shaft 149, shaft 162 makes one complete revolution and the vacuum hood is moved so as to move the mouths 186 and 187 forwardly and backwardly in the spaces provided between the side frame members 17 and the central frame member 19 of the impression panel.

Referring particularly to Fig. 1, a similar vacuum hood 195 is carried upon a pair of angle irons 196 which are secured at their ends by means of screws 197 to a portion of the gib 167 which extends beyond the frame 123. The angle irons 196 carry a pair of transverse angle irons 198 which are mounted for relative transverse movement with respect to the angle irons 196. The vacuum hood 195 is rigidly secured to the transverse angle irons 198 and the mounting arrangement is in all respects similar to the arrangement hereinbefore described with regard to the vacuum hood 181.

Rotation of the shaft 149 functions to rotate arm 155 which, in turn, causes the gib 167 to reciprocate horizontally. This movement is imparted to vacuum hood 195, the mouths of which move adjacent to and parallel with the slats 21 of the impression member. To rigidify the structure comprising vacuum hoods 181 and 195 an angle member 199 is secured at each of its ends to the hoods 181 and 195. If desired the adjacent mouths of the vacuum members 181 and 195, although separate, may be welded together as indicated at 200 in Fig. 1.

To facilitate the flow of air through the vacuum hoods baffles 201, 202 and 203 may be positioned within each of the hoods (Figs. 8, 9 and 10).

During the period that the projections 24 carried by the impression panel enter the mass of starch 16 as the frame of the printer mechanism descends, the impression panel is subjected to a series of impacts or raps which facilitate the forming of well defined indentations in the body of the starch. To accomplish this operation a mutilated ratchet wheel 204 is mounted upon shaft 153, that is, the shaft which reciprocates the gib 167. A bar 205 carried upon a collar 206 (Figs. 4, 5 and 13) extends upwardly from said collar and adjacent the top of the frame of the machine is bent at right angles to itself as indicated at 206' in Fig. 4. At the end of said bar a pawl 207 is carried by means of screws 208, said pawl being adapted for engagement with the teeth 209 of the ratchet wheel 204.

The sleeve 206 is carried upon pin 210 which in turn is journalled in bearing 211 carried upon plate 212 which is mounted upon the lower portion of the frame of the machine, the plate 212 being adjustably secured by means of screws 213 which engage in slots 214 provided in the plate 212.

Another bar 215 is rigidly secured at its end to collar 206, said latter bar being disposed at right angles to the bar 205. The opposite end of bar 215 extends inwardly toward the central portion of the machine and terminates immediately above the central frame member 19 of the impression panel. A relatively short connecting bar 216 is rigidly fastened to the end of bar 215 and projects downwardly therefrom. At the end of the bar 216 a rapping member 217 is rigidly carried, said member being disposed adjacent the upper portion of the central frame member 119 and being positioned substantially parallel to said central frame member.

At the opposite end of the frame of the printing mechanism a mutilated ratchet wheel 218 is mounted upon shaft 162, the ratchet wheel 218 being identical in construction with the ratchet wheel 204 and being positioned upon shaft 162 with its teeth occupying the same angular position as the teeth upon the ratchet wheel 204. A bar arrangement identical with the bars 205, 206, 215 and 216 is associated with the ratchet wheel 218, the bar corresponding to the bar 206 carrying a pawl which is engageable with the teeth of the ratchet wheel 218. The bar corresponding to the bar 216 is connected rigidly to the opposite end of the rapping bar 217.

The arrangement is such that during rotation of the shaft 149 the shafts 153 and 162 are rotated in step therewith and the position of the ratchet wheels 204 and 218 upon their respective shafts causes the bar arrangement, hereinbefore described, to oscillate about their respective bearing points. In this fashion the rapping bar 217 is raised and lowered in quick succession thereby imparting to the central frame member 19 a series of sharp impacts which are transmitted to the projections 24 facilitating their entrance into the mass of starch.

Referring particularly to Fig. 1 a screw 219 is threadedly positioned in a portion of the end frame member 4, said screw carrying a projection 220 of relatively restricted diameter. A compression spring 221 embraces the projection 220 and engages with the end of bar 206 (Fig. 4) thereby tending to rock the bar assembly in a counterclockwise direction as viewed in Fig. 4 about the pivot pin 210. When the pawls carried by the bars engage the teeth of the mutilated ratchet wheels the rocking motion imparted to the bar assembly acts against the compressional force of spring 221. The arrangement is such that the pawl teeth tend to lift the rapping bar 217 and the spring 221 tends to cause said bar to descend into sharp contact with the central frame member 19.

As has been hereinbefore described the printer mechanism 1 is periodically moved downwardly and upwardly in timed relationship to the passage of trays 15 upon the conveyor 14. The mechanism for lowering and raising the printer device 1 is described as follows: A bracket 222 is mounted upon the upper portion of the end frame member 4 and is secured thereto by means of screws 223. The bracket 222 carries a collar 224 in which one end of a rod 225 is carried. At the opposite end of the machine a bracket 226 is secured to the upper end of end frame member 5 by means of screws 227, the bracket 226 carrying a collar 228 in which the opposite end of rod 225 is positioned.

Rod 225 extends beyond collar 224 and a sleeve 229 embraces the extending end of the rod. The sleeve carries a bearing 230 in which a vertical drive shaft 231 is journalled. A collar 232 is rigidly positioned upon the shaft 231 and abuts the lower portion of bearing 230. A sprocket wheel 233 is rigidly secured to shaft 231 and a sprocket chain 234 is trained around the sprocket wheel 233. At the opposite end of the machine a sleeve 235 embraces an extending end of rod 225 and carries a bearing 236 in which a shaft 237 is journalled. A collar 238 is rigidly carried upon shaft 237 and is adapted to abut the lower surface of the bearing 236. A sprocket wheel 239 is rigidly carried upon shaft 237 and sprocket chain 234 is trained around the sprocket wheel 239.

Shaft 231 extends above sprocket wheel 233 and carries adjacent its upper end a handle wheel 240 which is rigidly secured to shaft 231. Similarly, shaft 237 extends above sprocket wheel 239 and a nut 241 is secured to the upper end of said shaft. A coil spring 242 embraces shaft 231 between hand wheel 240 and sprocket wheel 233 and a coil spring 243 embraces shaft 237 between nut 241 and sprocket wheel 239. The arrangement is such that by rotation of hand wheel 240 shafts 231 and 237 are simultaneously rotated, sprocket wheels 233 and 239 being of the same size whereby shafts 231 and 237 rotate simultaneously through equal angular distances.

Referring particularly to Figs. 14 and 15, shaft 231 at its lower end is provided with screw threads 244 which engage with a sleeve 245. Similarly, the lower end of shaft 237 is provided with screw threads 246 which engage with an internally threaded sleeve 247. The sleeve 245 is integrally secured to a cam roller support 248 and sleeve 247 is integrally secured to a similar cam roller support 249. A cam roller 250 is carried by the support 248 and a similar cam roller 251 is carried by the support 249.

The reference numeral 252 indicates a drive shaft which at one end is associated with the main drive of the conventional candy making machine. At the opposite end of the drive shaft 252 a bevel gear 253 is carried, said gear being adapted to mesh with a bevel gear 254 carried upon a shaft 255 which is journalled in the opposite main frame members 10 and 11. At the opposite end of shaft 255 a spur gear 256 is mounted, said gear meshing with an idler gear 257 journalled upon shaft 258 which is carried by the frame member 10. The idler gear 257 meshes with a spur gear 259 journalled upon shaft 260 also carried by the frame member 10. Gear 259, in turn, meshes with idler gear 261 journalled upon shaft 262 carried upon frame member 10 and the idler gear 261 meshes with spur gear 263 carried upon a transverse shaft 264 which is journalled in the main frame members 10 and 11.

A cam 265 having an internal cam slot 266 is mounted upon an end of shaft 264 exteriorly of the frame member 10 and a similar cam 267 having an internal cam slot 268 is mounted upon the opposite end of shaft 264 exteriorly of the main frame member 11. Cam roller support 248 is provided with a slot 269 which embraces that portion of shaft 264 included between cam 265 and spur gear 263 and cam roller support 249 is provided with a similar slot 270 which embraces that portion of shaft 264 included between cam 267 and a spacer bearing 271 mounted upon the exterior face of the main frame member 11.

The arrangement is such that rotation of the drive shaft 252 imparts rotation to the transverse shaft 255. Through the agency of the various gears hereinbefore described this rotation is imparted to the cam shaft 264 whereby cams 265 and 267 are rotated. The rotation of the cams 265 and 267 impart a reciprocatory motion to the shafts 231 and 237. Upward movement of said shaft raises the rod 225 which is secured to the frame of the printer mechanism by means of collars 224 and 228. As has been hereinbefore described the drive of the machine is such that the chain conveyor 14 moves in stepwise fashion. This same stepwise movement of shaft 252 also obtains, the timing being such that one tray moves forwardly from beneath the printer 1 and another tray occupies the position beneath the printer mechanism while shaft 252 is making one revolution. During the period that a tray 15 dwells beneath the printer mechanism the shaft 252 makes one revolution which imparts to the printer mechanism 1 one complete cycle of reciprocatory motion. In other words, while chain 14 is in motion shaft 252 remains stationary and conversely when chain 14 is stationary shaft 252 rotates to lower and raise the printer mechanism 1.

Referring particularly to Fig. 14, an arm 272 is pivotally connected upon the pivot pin 260 which in turn is supported by the main frame member 10. A spur gear 273 is mounted upon a shaft 274 carried at the end of the arm 272, the spur gear 273 being adapted to mesh with spur gear 259. A sprocket wheel 275 is also mounted upon shaft 274 carried at the end of arm 272, said sprocket wheel and spur gear 273 moving as a unit.

A clevis 276 is connected to shaft 274 and a rod 277 is threadedly connected to the clevis. The rod at its upper end is threadedly connected to clevis 278 which in turn embraces shaft 149. A sprocket wheel 279 is rigidly carried upon shaft 149 and a sprocket chain 280 is trained around sprocket wheels 275 and 279. In this fashion shaft 149 together with the various elements hereinbefore described operated by rotation of said shaft, is driven by shaft 252 in timed relationship with the forward passage of the trays 15 and the lowering and raising of the printer mechanism 1.

As has been hereinbefore described, hand wheel 240 functions to rotate shaft 231 and by means of sprocket chain 234 rotation is simultaneously imparted to shaft 237. The sprocket wheels over which the sprocket chain 234 is trained bear a one-to-one relationship to each other and consequently shafts 231 and 237 are rotated in identical fashion. Rotation of shafts 231 and 237 functions to change the effective lengths of said shafts inasmuch as the threaded ends 244 and 246 of said shafts respectively engage in the sleeves 245 and 247 of the cam roller supports 248 and 249. By controlling the effective lengths of rods 231 and 237 the degree of vertical movement of the printing mechanism 1 is controlled. This, in turn, controls the depth to which the projections 24 penetrate into the starch mass 16.

As has been hereinbefore described, the rapping bar 217 is normally urged by spring 221 toward the central frame member 19 of the impression panel. Normally the rapping bar 217 rests upon the upper portion of the central frame member 19 and is supported thereby. When it is desired to change impression panels a mechanism, hereinafter described, is provided for raising the rapping bar 217 so that the impression panel may be slid beneath the frame of the printing mechanism without being obstructed by the rapping bar which would normally occupy a position beneath the plane of the upper surfaces of the frame members 17 and 19 of the impression panel when said panel is slid into place.

Referring particularly to Figs. 3, 4, 12 and 13, an arm 281 is rigidly connected to a projecting portion of shaft 53, said arm being secured to said shaft by means of set screw 282. A pair of collars 283 function to properly position the arm 281 upon the shaft 53. A bolt 284 is carried at the upper end of arm 281 and projects through an elongated slot 285 provided in lever arm 286. The lever arm 286 is carried upon a shaft 287 which is journalled in the end frame member 4. Shaft 287 on the inner side of the end frame member 4 carries a lug 288 which is positioned immediately beneath bar 215 comprising a portion of the rapping mechanism.

When the arm 66 is manipulated by handle 68 to move rods 41 and 48, the movement of rod 41, depending upon the axial direction in which the rod moves, will raise or lower the shaft 53. When the rod 41 is so moved as to release the frame members 18 of the impression panel the shaft 53 is raised thereby raising the lever arm 286. This operation rotates shaft 287 thereby raising lug 288 into contact with the bar 215. Upward movement of the bar 215 raises the rapping bar 217 above the surface of the central frame member 19 and said bar is maintained in such upraised position until arm 66 is manipulated to lock another impression frame upon the machine. The operation of locking the impression frame lowers the shaft 53 and rotates the lug 288 away from the lower portion of bar 215 thereby permitting the rapping bar 217 to resume its normal position on top of the central frame member 19.

In operation, prior to the passage on the conveyor 14 of the starch trays 15 the printing mechanism 1 is brought to its upraised position. The arm 66 is rotated in a counterclockwise direction as viewed in Fig. 2 thereby opening the clamping jaws 52 and 58. Simultaneously the rapping bar 217 is raised by the rotation of the lug 288. The machine is then in position to receive an impression panel.

The impression panel is positioned beneath the machine by sliding the frame members into supported contact upon the jaws 52 and 58. At this period of operation, as hereinbefore described, the jaws are open to the extent to permit the free passage of the frame members 18 of the impression panel between the jaws 52 and 58 and the lower portion of the printing mechanism frame. The frame is moved upon the surface of the jaws until it contacts a pair of stops 289 which are secured to the frame member 2 by means of screws 290 (Fig. 3). The stops 289 function as an indexing device for properly positioning the impression panel beneath the printer mechanism 1.

With the impression panel properly disposed, as hereinbefore described, the arm 66 is rotated in a clockwise direction, as viewed in Fig. 2. This operation causes the jaws 52 and 58 to clamp the frame members 18 of the impression panel securely to the lower face of the frame of the printing mechanism 1. In view of the fact that both rods 41 and 48 are biased by springs 86 and 91 respectively the arm 66 can be moved so as to engage pawl 71 with a desired ratchet tooth 63. In other words, the impression frame is resiliently clamped to the lower portion of the printer mechanism.

As a feature of the present invention it can readily be seen that an impression panel may be mounted or removed from the printer mechanism in a most convenient manner, it being necessary only to move the panel upon the open jaws 52 and 58 to the indexed position determined by the stops 289 and then to manipulate the arm 66 to resiliently clamp the impression panel in place. During the operation of sliding the impression panel upon the jaws 52 and 58 the rapping bar 217 is in upraised position and offers no obstruction to the movement of the impression panel into proper position.

Operation of the candy making machine, as a whole, may then commence and the conveyor chains 14 carry a tray 15 beneath the printer mechanism while said mechanism is maintained in upraised position by means of the rods 231 and 237. The timing arrangement between the candy making machine proper and the printer mechanism is such that when the conveyor chain 14 stops to position a tray beneath the printer mechanism shaft 252 commences rotating.

The rotation of shaft 252 causes the rotation of the cam shaft 264 and hence cams 265 and 267 are rotated in unison. Through the agency of the cam rollers 250 and 251 operating in the slots 266 and 268 respectively the rods 231 and 237 are moved downwardly thereby carrying the entire printer mechanism downwardly.

Through the agency of gears 259 and 273 and sprocket chain 266, shaft 149 is rotated during the period that the mechanism 1 is descending. The rotation of shaft 149 causes lateral or horizontal movement of the vacuum hoods 191 and 195 thereby moving the mouths 186 and 187 of both of the vacuum hoods horizontally adjacent the upper surfaces and parallel to the slots 21.

After a predetermined downward movement of the mechanism 1 the mold members or projections 24 contact the upper surface of the starch mass 16 carried in the tray 15 and said projections tend to embed themselves in the upper surface of said starch mass. At this period continued rotation of shaft 149 brings the teeth 209 of the ratchet wheel 204 into contact with the pawl 207. In view of the fact that a similar ratchet wheel 218 is positioned at the opposite end of the printer mechanism, the teeth of both ratchet wheels engage their respective pawls simultaneously. The bar arrangement associated with each ratchet wheel is thereby rocked causing the rapping bar 217 to be raised until the pawls pass over the high points of the ratchet teeth. The spring 221 then functions to lower the rapping bar with a sharp impact. This operation is continued and the impacts received by the central frame member 19 are imparted to the projections 24 as said projections move into the body of the starch. This rapping operation facilitates the formation of clear-cut indentations in the starch body.

During the operation of providing indentations in the starch body, the projections 24 displace the starch in the upper portion of the mass. Heretofore difficulty has been encountered in that the action of the projections displacing the starch in order to form the indentations has given rise to the formation of dust, that is, finely divided starch particles arise from the face of the starch mass. As the operation proceeds, such finely divided particles arising in the form of starch dust tend to clog the openings 22 between adjacent slats. When this condition arises the lowering of the printer mechanism tends to compress the air confined between the impression panel and the face of the starch mass. Said air cannot escape upwardly through the screen 23 and slots 22 if said slots are clogged, hence the air escapes laterally parallel to the face of the starch mass. This rapid movement of the air tends to increase the formation of starch dust. After the indentations have been provided and the printer mechanism is raised, with the slots 22 clogged, a condition of vacuum is established between the face of the starch mass and the impression panel. This condition tends to displace starch particles and cause them to be deposited in the indentations and also tends to augment the formation of starch dust.

As a feature of the present invention the vacuum mouths 186 and 187 of both of the vacuum hoods are disposed closely adjacent the upper surfaces of the slats 21 and hence clogging of the slots 22 and the wire 23 is effectively prevented. As has been hereinbefore described all during the period that the printer mechanism is lowering and raising the mouths 186 and 187 of the vacuum hoods traverse the impression panel in the manner described thereby removing all starch which may be displaced in the form of starch dust due to the formation of the indentations. After the indentations have been provided in the starch carried by the tray beneath the printing mechanism and the mechanism 1 has been raised by the operation of the cams 265 and 267 shaft 252 stops with the mechanism 1 in upraised position as shown in Fig. 14 and the conveyor chain 14 moves forwardly until the next adjacent tray is positioned beneath the printer mechanism 1. The operation of printing or forming the indentations in the starch mass is thereupon repeated.

To facilitate the lowering and raising of mechanism 1 an arm 291 is pivotally mounted as at 292 in Fig. 14 upon a portion of the frame 10. At one end of the arm a rod 293 is pivotally carried, said rod carrying a counterweight 294. An extension of rod 293, designated by the numeral 295, is guided for vertical motion in lug 296 secured to the face of frame 10. The opposite end of the lever arm 291 is pivotally connected as at 297 to an arm 298 which is mounted upon a shaft 299 carried upon the sliding plate 6.

Referring particularly to Fig. 15, a similar counterweight arrangement is employed comprising counterweight 300 mounted upon shaft 301 which is pivotally connected to arm 302 which in turn is connected by means of arm 303 to the slidable plate 7.

It is apparent that herein is contemplated a printer for a candy making machine which is provided with means whereby an impression panel may be employed for long periods of time without removal from the machine for purposes of cleaning, and in addition, means is also provided for quickly and conveniently removing and mounting an impression panel upon the printer when necessity requires a change of impression panels.

I claim as my invention:

1. A machine for providing mold indentations in a mass of finely divided mold material which comprises, a printer frame, an impression panel carried by said frame, projections upon the lower face of said impression panel, means for moving said frame downwardly to cause said projections to penetrate into a mass of mold material carried beneath the frame, a vacuum hood in which a condition of vacuum exists positioned upon said frame above said impression panel having an inlet mouth positioned adjacent and above said impression panel, and means for moving said hood to move said mouth substantially parallel to the top of said impression panel during movement of said printer frame.

2. A machine for providing mold indentations in a mass of finely divided mold material which comprises, a printer frame, a foraminous impression panel carried by said frame, projections upon the lower face of said impression panel, means for moving said frame downwardly to cause said projections to penetrate into a mass of mold material carried beneath the frame, a vacuum hood in which a condition of vacuum exists positioned upon said frame above said impression panel having an inlet mouth positioned adjacent and above said foraminous impression panel, and means for moving said hood to move said mouth substantially parallel to the top of said foraminous impression panel during movement of said printer frame.

3. A machine for providing mold indentations in a mass of finely divided mold material which comprises, a printer frame, means for supporting a mass of said mold material beneath said frame, a foraminous impression panel carried by said frame, projections upon the lower face of said impression panel, means for moving said frame downwardly to cause said projections to penetrate the mass of mold material and for moving said frame upwardly to remove said projections from the mold material, a vacuum hood in which a condition of vacuum exists positioned upon said frame above said impression panel having an inlet mouth positioned adjacent and above said foraminous impression panel, and means for moving said hood to move said mouth parallel to the top of said foraminous impression panel during movement of said printer frame.

4. A machine for providing mold indentations in a mass of finely divided mold material which comprises, a printer frame, means for supporting a mass of said mold material beneath said frame, a foraminous impression panel carried by said frame, projections upon the lower face of said impression panel, means for moving said frame downwardly to cause said projections to penetrate the mass of mold material and for moving said frame upwardly to remove said projections from the mold material, a vacuum hood in which a condition of vacuum exists positioned upon said frame above said impression panel having an inlet mouth positioned adjacent and above said foraminous impression panel, and means for moving said hood backwardly and forwardly to move said mouth backwardly and forwardly parallel to, and closely adjacent the top of said foraminous panel during downward and upward movement of said printer frame.

5. A machine for providing mold indentations in a mass of finely divided mold material which comprises, a printer frame, means for supporting a mass of said mold material beneath said frame, an impression panel, projections carried upon the lower face of said impression panel, means for removably clamping said impression panel upon said frame, means for moving said frame downwardly to cause the projections carried by said panel to penetrate the mass of mold material, a vacuum hood in which a condition of vacuum exists positioned upon said frame above said impression panel having an inlet mouth positioned adjacent and above said impression panel, and means for moving said hood to move said mouth parallel to the top of said impression panel during movement of said printer frame.

6. A machine for providing mold indentations in a mass of finely divided mold material which comprises, a printer frame, means for supporting a mass of said mold material beneath said frame, an impression panel, projections carried upon the lower face of said impression panel, means for removably clamping said impression panel upon said frame, means for moving said frame downwardly to cause the projections carried by said panel to penetrate the mass of mold material, a vacuum hood in which a condition of vacuum exists positioned upon said frame above said impression panel having an inlet mouth positioned adjacent and above said impression panel, and means timed with the movement of said printer frame for moving said hood to move said mouth parallel to, and closely adjacent the top of said impression panel during movement of said printer frame.

7. A machine for providing mold indentations in a mass of finely divided mold material which comprises, a printer frame, means for supporting a mass of said mold material beneath said frame, an impression panel carried by said frame, projections upon the lower face of said impression panel, means for moving said frame downwardly to cause said projections to penetrate the mass of mold material, a guide carried by said frame parallel to said impression panel, a member slidably carried by said guide, a vacuum hood in which a condition of vacuum exists positioned upon said slidable member above said impression panel having an inlet mouth positioned adjacent and above said impression panel, and means for moving said slidable member in said guide to move the mouth of said hood parallel to the top of said impression panel during movement of said printer frame.

8. A machine for providing mold indentations in a mass of finely divided mold material which comprises, a printer frame, an impression panel carried by said frame, projections upon the lower face of said impression panel, means for moving said frame downwardly to cause said projections to penetrate into a mass of mold material supported beneath said frame, a vacuum hood in which a condition of vacuum exists positioned upon said frame above said impression panel having an inlet mouth positioned adjacent and above said impression panel, and means for moving said hood to move said mouth parallel to the top of said impression panel during movement of said printer frame to withdraw finely divided mold material displaced from said mass by the penetration of said projections into the mass.

9. A machine for providing mold indentations in a mass of finely divided mold material which comprises, a printer frame, a foraminous impression panel carried by said frame, projections upon the lower face of said impression panel, means for moving said frame downwardly to cause said projections to penetrate into a mass of mold material carried beneath the frame and for moving said frame upwardly to withdraw said projections from said mass, a vacuum hood in which a condition of vacuum exists positioned upon said frame above said impression panel having an inlet mouth positioned adjacent and above said foraminous impression panel, and means for moving said hood to move said mouth parallel to the top of said impression panel during movement of said printer frame to withdraw finely divided mold material displaced from said mass by the penetration and withdrawal of said projections through the foraminous panel.

10. A machine for providing mold indentations in a mass of finely divided mold material which comprises, a printer frame, a foraminous impression panel, means for clamping said impression panel upon the lower portion of said frame, a plurality of projections carried upon the bottom of said impression panel, means for moving said frame downwardly to cause said projections to penetrate into a mass of finely divided mold material carried beneath said frame, means carried by said frame for rapping said panel to vibrate said projections as the projections penetrate into said mold material, a vacuum hood in which a condition of vacuum is established positioned upon said frame above said panel, an inlet mouth carried by said hood and disposed adjacent the upper portion of said panel, and means for moving said vacuum hood to move said mouth substantially parallel and closely adjacent said panel during movement of said printer frame to withdraw through the foraminous panel finely divided mold material displaced from said mass.

11. A machine for providing mold indentations in a mass of finely divided mold material which comprises, a printer frame for holding an impression panel of the type comprising a defining frame carrying a wire mesh panel upon which projections are mounted, means for clamping said impression panel upon said printer frame with the projections extending downwardly, means for moving said printer frame downwardly to cause said projections to penetrate into a mass of finely divided mold material carried beneath said frame, means carried by said printer frame for rapping said panel to vibrate said projections as the projections penetrate into said mold material, a vacuum hood in which a condition of vacuum is established positioned upon said printer frame above said panel, an inlet mouth carried by said hood and disposed adjacent the upper portion of said panel, and means for moving said vacuum hood to move said mouth substantially parallel and closely adjacent said panel during movement of said printer frame to withdraw through the wire mesh panel finely divided mold material displaced from said mass.

12. A machine for providing mold indentations in a mass of finely divided mold material which comprises, a printer frame for holding an impression panel of the type having a defining rectangular frame and a central frame member dividing the panel in half, and a wire mesh screen secured to said defining frame, means for clamping said impression panel upon the lower portion of said printer frame, a plurality of projections carried upon the bottom of said wire mesh, means for moving said frame downwardly to cause said projections to penetrate into a mass of finely divided mold material carried beneath said frame, means carried by said frame for rapping the central frame member of said panel to vibrate said projections as the projections penetrate into said mold material, a vacuum hood in which a condition of vacuum is established positioned upon said printer frame above said panel, two inlet mouths carried by said hood and disposed adjacent the upper portion of wire mesh one on each side of said central frame member, and means for moving said vacuum hood to move said mouths substantially parallel and adjacent said wire mesh during movement of said printer frame to withdraw through the wire mesh finely divided mold material displaced from said mass.

13. A machine for providing mold indentations in a mass of finely divided mold material which comprises, a printer frame, a foraminous impression panel, means for clamping said impression panel upon the lower portion of said frame, a plurality of projections carried upon the bottom of said impression panel, means for moving said frame downwardly to cause said projections to penetrate into a mass of finely divided mold material carried beneath said frame, means carried by said frame for rapping said panel as the projections penetrate into said mold material, a vacuum hood in which a condition of vacuum is established positioned upon said frame above said panel, an inlet mouth carried by said hood and disposed adjacent the upper portion of said panel, guide means carried upon the printer frame, supporting means for said vacuum hood slidably positioned in said guide means, and means for moving said supporting means to move said vacuum hood and said mouth substantially parallel and closely adjacent said panel during movement of said printer frame to withdraw through the foraminous panel finely divided mold material displaced from said mass.

14. In combination with a machine for providing mold indentations in a mass of finely divided mold material of the type comprising a frame carrying an impression panel having projections on an obverse face thereof for providing mold indentations in said mold material including means for moving said impression panel into contact with said finely divided mass, of guide means carried by said frame, a block movably positioned in said guide means, vacuum means carried by said block, and means for moving said block in said guide means to move said vacuum means adjacent the reverse face of said impression panel.

15. In combination with a machine for providing mold indentations in a mass of finely divided mold material of the type comprising a frame carrying an impression panel having projections on an obverse face thereof for providing mold indentations in said mold material including means for moving said impression panel into contact with said finely divided mass, of guide means carried by said frame, a gib having a slot, a block carried by said gib and movably carried by said guide means, vacuum means carried by said gib, and means for moving said gib and block in said guide means to move said vacuum means adjacent and parallel to the reverse face of said impression panel comprising a rotatable arm engageable in the slot in said gib.

16. In combination with a machine for providing mold indentations in a mass of finely divided mold material of the type comprising a frame carrying an impression panel having projections on an obverse face thereof for providing mold indentations in said mold material including means for moving said impression panel into contact with said finely divided mass, of guide means carried by said frame, a gib having a slot, a block carried by said gib and movably carried by said guide means, vacuum means carried by said gib, and means for moving said gib and block in said guide means to move said vacuum means adjacent and parallel to the reverse face of said impression panel comprising a rotatable arm engageable in the slot in said gib and means for rotating said arm in timed relationship with movement of said impression panel.

17. In combination with a machine for providing mold indentations in a mass of finely divided mold material comprising a frame, means for clamping upon said frame an impression panel carrying projections for penetration into a mass of said mold material, said clamping means comprising a pair of arms pivotally mounted upon said frame, a clamping jaw carried at one end of each arm, a toggle device connected to said frame and to each of said arms, a lever carried by said frame, resilient means connecting said lever to each of said toggle devices for simultaneously actuating said toggle devices to move said jaws to clamp an impression panel upon said frame and ratchet and pawl means carried by said lever and frame for retaining said jaws in clamping position.

18. A machine for providing mold indentations in a mass of finely divided mold material which comprises, a printer frame, a foraminous impression panel comprising defining frame members and a central frame member, means for clamping said impression panel upon the lower portion of said frame, a plurality of projections carried upon the bottom of said impression panel, means for moving said printer frame downwardly to cause said projections to penetrate into a mass of finely divided mold material carried beneath said printer frame, means carried by said printer frame for rapping the central frame member of said panel as the projections penetrate into said mold material to vibrate said projections, a pair of vacuum hoods in which a condition of vacuum is established positioned upon said printer frame above said panel, a pair of inlet mouths carried by each hood and disposed adjacent the upper portion of said panel, the inlet mouths of each hood being disposed on opposite sides of said central frame member, and means for moving said vacuum hoods to move said mouths substantially parallel and closely adjacent said panel during movement of said printer frame to withdraw through the foraminous panel finely divided mold material displaced from said mass.

19. A machine for providing mold indentations in a mass of finely divided mold material which comprises, a printer frame, a foraminous impression panel comprising defining frame members and a central frame member, means for clamping said impression panel upon the lower portion of said frame, a plurality of projections carried upon the bottom of said impression panel, means for moving said printer frame downwardly to cause said projections to penetrate into a mass of finely divided mold material carried beneath said printer frame and for moving said printer frame upwardly to withdraw said projections from the mold material mass, means carried by said printer frame for rapping the central frame member of said panel as the projections penetrate into said mold material to vibrate said projections, a pair of vacuum hoods in which a condition of vacuum is established positioned upon said printer frame above said panel, a pair of inlet mouths carried by each hood and disposed adjacent the upper portion of said panel, the inlet mouths of each hood being disposed on opposite sides of said central frame member, and means for moving said vacuum hoods to move said mouths substantially parallel and closely adjacent said panel in timed relationship with the movement of said printer frame to withdraw through the foraminous panel finely divided mold material displaced from said mass.

20. A machine for providing mold indentations in a mass of finely divided mold material which comprises, a printer frame, an impression panel carried by said frame, projections upon the lower face of said impression panel, means for moving said frame downwardly to cause said projections to penetrate into a mass of mold material carried beneath the frame, a vacuum hood in which a condition of vacuum exists positioned upon said frame above said impression panel having an inlet mouth positioned adjacent and above said impression panel, and means for moving said hood to move said mouth adjacent to the top of said impression panel during movement of said printer frame.

JOSEPH VARAK.

References Cited in the file of this patent

UNITED STATES PATENTS

| Number | Name | Date |
|---|---|---|
| 356,993 | Fahnestock | Feb. 1, 1887 |
| 648,353 | Carlson | Apr. 24, 1900 |
| 1,169,602 | Bausman | Jan. 25, 1916 |
| 1,198,798 | Werner | Sept. 19, 1916 |
| 1,249,595 | Cameron | Dec. 11, 1917 |
| 1,794,021 | Lee et al. | Feb. 24, 1931 |
| 2,028,410 | Rapisarda | Jan. 21, 1936 |
| 2,030,871 | Higgins et al. | Feb. 18, 1936 |
| 2,097,402 | Flarsheim | Oct. 26, 1937 |
| 2,385,493 | Bowers | Sept. 25, 1945 |